United States Patent
Matsumoto et al.

(10) Patent No.: US 7,276,012 B2
(45) Date of Patent: Oct. 2, 2007

(54) RADIAL NEEDLE-LIKE ROLLER BEARING AND PINION SHAFT

(75) Inventors: Yoichi Matsumoto, Kanagawa (JP); Koichi Yamamoto, Kanagawa (JP); Seigou Urakami, Kanagawa (JP); Aya Kikuchi, Kanagawa (JP)

(73) Assignee: NSK Ltd., Tokyo (JP)

( * ) Notice: Subject to any disclaimer, the term of this patent is extended or adjusted under 35 U.S.C. 154(b) by 178 days.

(21) Appl. No.: 11/102,707

(22) Filed: Apr. 11, 2005

(65) Prior Publication Data
US 2005/0232527 A1 Oct. 20, 2005

(30) Foreign Application Priority Data
Apr. 16, 2004 (JP) ............ P.2004-121325
Jun. 24, 2004 (JP) ............ P.2004-185955

(51) Int. Cl.
*F16H 57/08* (2006.01)
(52) U.S. Cl. .................................. 475/348
(58) Field of Classification Search ........... 384/572, 384/573, 551, 625, 474, 475; 475/348
See application file for complete search history.

(56) References Cited

U.S. PATENT DOCUMENTS

| | | | |
|---|---|---|---|
| 3,686,978 A | * | 8/1972 | Knoblach et al. ........ 475/296 |
| 5,332,318 A | | 7/1994 | Chiba |
| 5,803,616 A | * | 9/1998 | Persson et al. ............ 384/473 |
| 6,562,151 B2 | | 5/2003 | Hirakawa et al. |
| 2002/0082133 A1 | | 6/2002 | Yoshikawa et al. |
| 2002/0121021 A1 | | 9/2002 | Kodama et al. |

FOREIGN PATENT DOCUMENTS

| | | |
|---|---|---|
| DE | 10 66 814 B | 10/1959 |
| DE | 12 68 444 B | 5/1968 |
| DE | 199 02 565 A1 | 7/2000 |
| DE | 101 25 118 A1 | 11/2002 |
| EP | 1 167 791 A2 | 1/2002 |
| JP | 4-126055 U | 11/1992 |
| JP | 5-62729 U | 8/1993 |
| JP | 7-293557 A | 11/1995 |
| JP | 2002-81528 A | 3/2002 |
| JP | 2003-301933 A | 10/2003 |

* cited by examiner

*Primary Examiner*—Dirk Wright
(74) *Attorney, Agent, or Firm*—Sughrue Mion, PLLC

(57) ABSTRACT

There is adopted a constitution of arranging a spacer 53 at a shaft center portion and arranging a retainer 52 and a roller 51 (cage & roller) at two sides thereof in order to prevent the roller (roller) from being rolled at the center portion in an axial direction of the shaft maximizing an amount of bending the shaft. At the double side rows, the bending of the shaft is not as large as that of the center portion and therefore, the roller (roller) is not hampered from being rolled smoothly.

10 Claims, 5 Drawing Sheets

RADIAL NEEDLE-LIKE ROLLER BEARING AND PINION SHAFT

BACKGROUND OF THE INVENTION

The present invention relates to a radial needle-like roller bearing and a pinion shaft used in, for example, a planetary gear mechanism of a vehicular automatic transmission.

A planetary gear mechanism is generally used in an automatic transmission mounted to a vehicle or the like. Meanwhile, in recent years, also an automatic transmission tends to be formed by multistages with an object of improving fuel cost. At the same time, a planetary gear mechanism referred to as so-to-speak Ravigneau type is tried to be used to form an automatic transmission of 4 speeds as a main stream currently by mutlistages of, for example, 5 speeds or 6 speeds to downsize the automatic transmission. The Ravigneau type planetary gear mechanism is combined with two planetary gear mechanisms commonly using a planetary gear and is described in, for example Patent Reference 1.

Here, a characteristic of the Ravigneau type planetary gear type mechanism resides in that since a width in a axial line direction of the planetary gear commonly used is enlarged, a length in an axial line direction of a pinion shaft supporting the planetary gear relative to a diameter thereof is prolonged, that is, the pinion shaft becomes slender. Meanwhile, as shown by Patent Reference 2, as a rolling bearing for supporting a planetary gear in a general planetary gear mechanism, there is frequently used a radial needle-like roller bearing in which a needle-like roller is arranged as a rolling member between a pinion shaft serving also as an inner ring of the bearing and the planetary gear serving also as an outer ring of the bearing. However, although an such a needle-like roller bearing, there is generally used an all roller type which is not provided with a retainer in a background art, recently, there is a case of using a so-to-speak cage & roller type having a retainer for rotating the planetary gear at high speed. When a plurality or more of rows of rollers (rollers) are constituted by the all roller type, it is general to provide a guide ring for guiding end portions of the rollers (rollers) between the rows. In contrast thereto, according to the cage & roller type, even when a plurality or more of those of rollers (rollers) are constituted, it is general that the guide ring is not provided since the retainer guides the end faces of the rollers (rollers).

[Patent Reference 1]
Japanese Utility Model Application Publication No. Hei4-126055

[Patent Reference 2]
Japanese Utility Model Application Publication No. Hei5-62729

Here, in a planetary gear mechanism, a planetary gear is revolved to move and therefore, a centrifugal force operated to the planetary gear and a force of being brought in mesh with other gear elastically deform a pinion shaft. Although hardened steel is normally used for the pinion shaft, owing to a retained austenite structure inevitably present therein, in using the pinion shaft at a high temperature equal to or higher than 100° C., the retained austenite structure is disintegrated to expand a volume thereof. When the pinion shaft is elastically deformed at 100° C. or higher, a rate of disintegrating the retained austenite structure at a portion of operating a tensile stress faster than at a portion of operating a compressive stress and therefore, generally, the remoter from the portion of the pinion shaft attached to a carrier, the more the plastically bending is brought about in a bow-like shape, and the higher the temperature of the shaft, the faster the speed of revolving the planetary gear, further, the slenderer and the longer the pinion shaft, the higher the torque loaded to the gear, the more the rate tends to increase.

Particularly, when the Ravigneau type planetary gear mechanism disclosed in, for example, Patent Reference 1 is used for downsizing the planetary gear mechanism of a vehicular transmission of an automatic transmission or the like, there poses a problem that plastic bending of the long pinion is liable to be brought about since the shaft length is prolonged. When a sum of the plastic bending and elastic bending determined by loading conditions of the shaft which increases agingly is increased and a distance between the shaft and an inner diameter face of the pinion gear becomes smaller than a roller diameter, there poses a problem that the roller (roller) cannot smoothly be rolled and flaking is brought about at the shaft or the roller (roller).

SUMMARY OF THE INVENTION

The invention is carried out in view of the above-described problems and it is an object thereof to provide a radial needle-like roller bearing and a pinion shaft capable of ensuring to smoothly roll a roller.

According to the first aspect of the present invention, there is provided a radial needle-like roller bearing arranged between a pinion shaft and a pinion gear in a planetary gear mechanism of a vehicular automatic transmission, the radial needle-like roller bearing including: rollers arranged in double rows, a plurality of retainers for retaining the rollers of the respective rows, and a spacer arranged between the retainers contiguous to each other.

According to the second aspect of the present invention, it is preferable that the pinion shaft is made of a steel and includes a surface hardened by quenching and a center portion which does not include a retained austenite structure, and the roller is rolled along a surface hardened by quenching.

According to the third aspect of the present invention, it is preferable that an amount of retained austenite at an outer surface of the pinion shaft covered by the spacer is lower than an amount of retained austenite at the surface of the pinion shaft at which the roller is rolled.

According to the forth aspect of the present invention, it is preferable that a nitrogen concentration of the surface of the pinion shaft is equal to or larger than 0.05% and equal to or smaller than 0.5%.

According to the fifth aspect of the present invention, it is preferable that a material of the pinion shaft includes chromium equal to or larger than 0.9% and equal to or smaller than 1.8%.

According to the sixth aspect of the present invention, it is preferable that the material of the pinion shaft includes silicon equal to or larger than 0.4% and equal to or smaller than 0.8%.

According to the seventh aspect of the present invention, it is preferable that a hardness of the pinion shaft is equal to or larger than Hv 300.

According to the eighth aspect of the present invention, it is preferable that the pinion shaft is provided with a hole for supplying a lubricant at the outer surface covered by the retainer.

According to the ninth aspect of the present invention, it is preferable that the spacer is made of a resin or made of a steel coated with a phosphate coating at a surface thereof.

According to the tenth aspect of the present invention, it is preferable that the pinion shaft is made of a steel, and a compressive residual stress of a surface layer portion is set to 500 through 1200 MPa and the amount of retained austenite is set to 15 through 40%.

According to the eleventh aspect of the present invention, there is provided a pinion shaft used in the radial needle-like roller bearing according to any one of the first aspect through the tenth aspect.

According to the twelfth aspect of the present invention, there is provided a radial needle-like roller bearing arranged between a pinion shaft and a pinion gear in a planetary gear mechanism of a vehicular automatic transmission, the radial needle-like roller bearing including:

rollers arranged in double rows, a plurality of retainers for retaining the rollers of the respective rows, and a spacer arranged between the retainers contiguous to each other, wherein the pinion shaft is made of a steel, and includes a surface hardened by quenching and a center portion which does not include a retained austenite structure, the roller is rolled along a surface hardened by quenching, a nitrogen concentration of the surface of the pinion shaft is equal to or larger than 0.05% and equal to or smaller than 0.5%, the material of the pinion shaft includes chromium equal to or larger than 0.9% and equal to or smaller than 1.8%, the hardness of the pinion shaft is equal to or larger than Hv 300, the spacer is made of a resin or made of a steel coated with a phosphate coating at a surface thereof, and a compressive residual stress of a surface layer portion is set to 500 through 1200 MPa, and the amount of retained austenite is set to 15 through 40%.

According to the thirteenth aspect of the present invention, there is provided a radial needle-like roller bearing arranged between a pinion shaft and a pinion gear in a planetary gear mechanism of a vehicular automatic transmission, the radial needle-like roller bearing including:

rollers arranged in double rows, a plurality of retainers for retaining the rollers of the respective rows, a spacer arranged between the retainers contiguous to each other, wherein the pinion shaft is made of a steel, and includes a surface hardened by quenching and a center portion which does not include a retained austenite structure, the roller is rolled along a surface hardened by quenching, a nitrogen concentration of the surface of the pinion shaft is equal to or larger than 0.05% and equal to or smaller than 0.5%, the material of the pinion shaft includes chromium equal to or larger than 0.9% and equal to or smaller than 1.8%, the material of the pinion shaft includes silicon equal to or larger than 0.4% and equal to or smaller than 0.8%, the hardness of the pinion shaft is equal to or larger than Hv 300, the spacer is made of a resin or made of a steel coated with a phosphate coating at a surface thereof, and a compressive residual stress of a surface layer portion is set to 500 through 1200 MPa, and the amount of retained austenite is set to 15 through 40%.

DETAILED DESCRIPTION OF THE PREFERRED EMBODIMENTS

Figure 3:
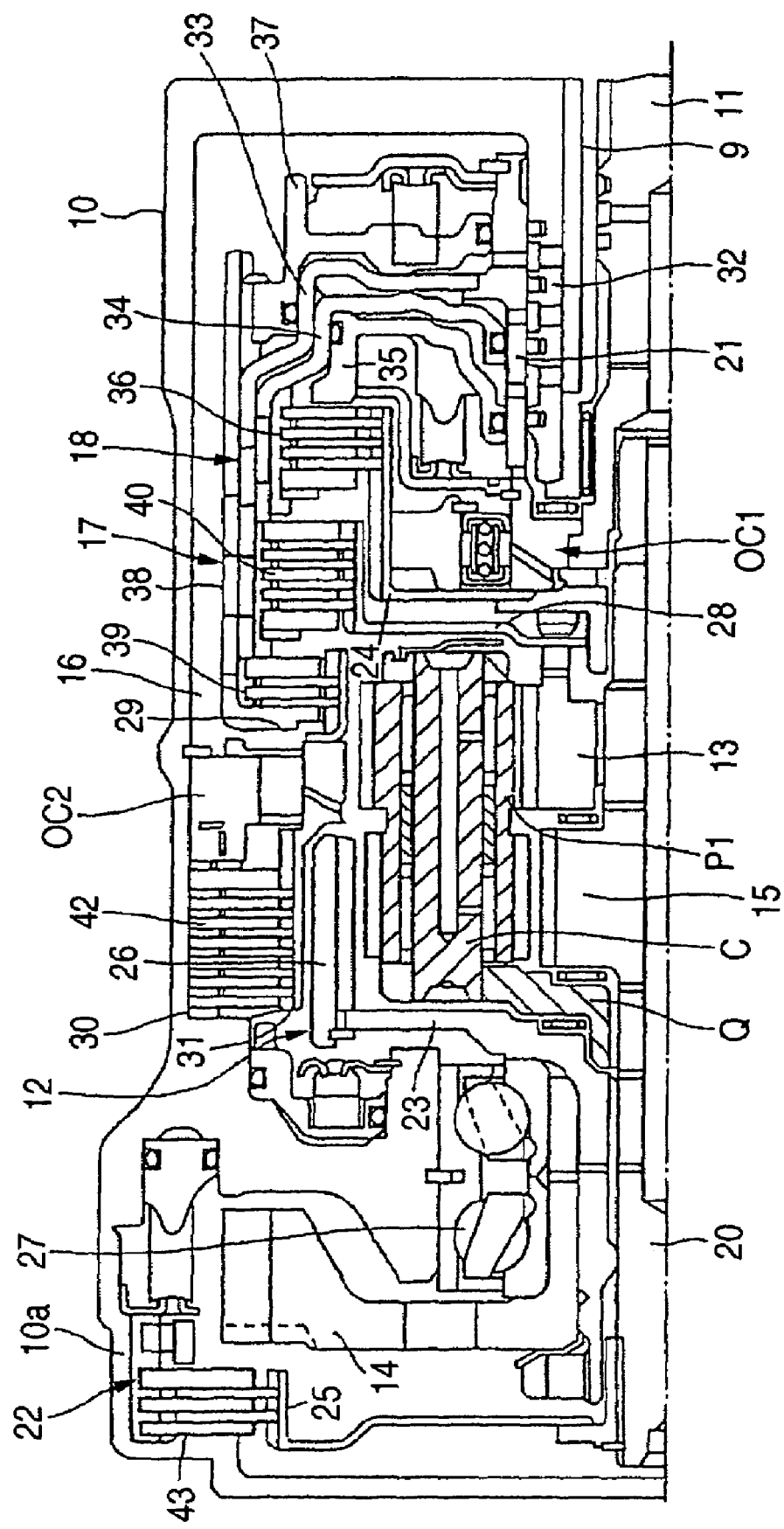
FIG. 3 is a partial sectional view of an automatic transmission 1 of a vehicle including a dial needle-like roller bearing according an embodiment.

A detailed explanation will be given of an embodiment of the invention in reference to the drawings as follows. FIG. 3 is a sectional view showing a portion of an automatic transmission of a vehicle including a radial needle-like roller bearing according to the embodiment.

In FIG. 3, at inside of a case 10, an input shaft 11 constituting an input member for transmitting rotation of an output of a turbine of a torque converter, not illustrated, to a planetary gear set 12 is arranged on a side of a front sun gear 13 of the planetary gear set 12. Further, a counter drive gear 14 is arranged, on a side of a rear sun gear 15 of the planetary gear set 12 by interposing a rear wall of the case 10. Further, an inner peripheral side of the planetary gear set 12 is arranged with a sun gear shaft 20 constituting a supporting shaft of the planetary gear set 12, according to the embodiment, the shaft is integrated with the rear sun gear 15 and is extended to penetrate the planetary gear set 12 and the counter drive gear 14.

The input shaft 11 is supported by the case 10 and connected to the turbine of the torque converter, respective clutches 16, 17, 18 and a first one way clutch. In details, according to the input shaft 11, a vicinity of a front end portion thereof is supported by a hollow stator shaft 19 fixed to a front wall of the case 10 constituted by an oil pump cover via a bush, further, a vicinity of a rear end portion thereof is supported via a needle bearing, a front end thereof is connected to a turbine hub (not illustrated) by spline engagement, and a rear end thereof is connected to an inner peripheral side member 21 of a hydraulic servo cylinder on sides of drums of the respective clutches 18, 17, 16 via an inner lace of the first one way clutch OC1.

According to the sun gear 20, an end portion thereof on one side is connected to the input shaft 11 via the clutch 18 and the first one way clutch OC1, and an end portion thereof on other side is connected to the case 10 via a brake 22 on an outer side penetrating the counter drive gear 14. In details, according to the sun gear 20, a front end thereof is supported by a recess portion at a rear end of the input shaft 11 via a bush, a vicinity of a rear end portion thereof is supported by an inner periphery of a shaft portion of a ring gear flange 23 via a bush, and is finally supported by the rear wall of the case 10 via a boss portion and a roller bearing of the counter drive gear 10 fitted to an outer periphery thereof. Further, a side of a front end portion of the sun gear 20 is connected to a side of a hub 24 of the clutch 18 by spline engagement. Further, a rear end of the sun gear shaft 20 is connected to a side of a hub 25 by spline engagement.

According to the planetary gear set 12, by supporting the front sun gear 13 and a carrier Q by the sun gear shaft 20 respectively via bushes and fixing a ring gear 26 by the counter drive gear 14 connected to the member by spline engagement via the ring gear flange 23 connected thereto by spline engagement, as a result, the planetary gear set 22 is supported by the rear wall of case 10 via a ball bearing 27. The front sun gear 13 of the planetary gear set 12 is connected to a side of a hub 28 of the clutch 17, the carrier Q is connected in parallel with a hub 29 of the clutch 16, a hub 31 of a brake 30 and an inner lace of a second one way clutch OC2.

In the gear train, the clutch 17 connecting the input shaft 11 to the front sun gear 13, the clutch 16 connecting the input shaft 11 to the clutch 17 and the carrier Q connecting the input shaft 11 to the rear sun gear 17, respectively, hydraulic servos and friction members of the respective clutches are summarizingly arranged at an outer periphery of a portion of connecting the input shaft 11 and the sun gear shaft 20. First, the clutch 17 is constituted by the inner peripheral side member 21 rotatably fitted to an outer periphery of a boss portion 32 extended from the oil pump fixed to an oil bump body constituting the front wall of the case 10 by a bolt, a hydraulic servo fitted with a piston 34 serving also as a drum of the clutch 17 to prevent rotation thereof to an inner side surrounded by a drum 33 an inner peripheral side of which is fixed thereto, and a friction member 40 connected to an outer periphery of a hub 28 arranged by connecting an inner periphery side thereof to an inner side of an inner periphery of a front end of the drum 33 and the front sun gear 13 respectively by spline engagement.

Next, the clutch 18 includes the drum 34 slidably fitted to insert into the inner peripheral side member 21 to serve also as the piston of the clutch 17, and a piston 35 fitted to insert into an inner side of a cylinder surrounded by the inner peripheral side member 21 and the drum 34, and is constituted by a hydraulic servo having a chamber of canceling a centrifugal hydraulic pressure on a rear side of the piston 35, and a friction member 36 respectively connected to an inner periphery of a front end of the drum 34 and an outer periphery of the hub 24 an inner peripheral side of which is connected to the input shaft 11 at a further inner periphery thereof by spline engagement. Further, the hub 24 of the clutch 18 is fixed with an outer lace of the first one way clutch OC1.

The clutch 16 is constructed by a constitution of constituting a piston by a drum 33 of the clutch 17 and connecting the piston 37 fitted to cover the piston conversely to a drum 38, and is constituted by a hydraulic servo having a chamber of canceling a centrifugal hydraulic pressure, and a friction member 39 connected to an outer periphery of a hub 29 connected to an inner lace of the second one way clutch OC2 fixed to the carrier Q of the planetary gear set 12 by a rivet and an inner periphery of the drum 38 by spline engagement.

In the hydraulic servos of the respective clutches arranged summarizingly in this way, the member 33 serving also as the inner periphery side member 21 common to the respective clutches and the drum of the clutch 17 and the piston of the clutch 16 is constituted by a member unmovable in an axial direction, and both of the drum 34 and the piston 35 of the clutch 18 are constituted by members movable in the axial direction. Therefore, the clutch 17 pinches the friction member 40 between the drum 33 of its own and the drum 34 of the clutch 18 to engage by supplying a servo hydraulic pressure from an oil path of the boss portion 32, the clutch 18 pinches the friction member 36 between the drum of its own serving also as the piston 34 of the clutch 17 and the piston 35 by pressing the piston 35 of its own by being exerted with a reaction force at the drum 33 of the clutch 17, and the clutch 16 pinches the friction member 39 by moving forward the drum 38 of its own to the drum 33 of the clutch 17 in the axial direction therebetween.

Next, the brake 30 is constituted by the hydraulic servo included in the rear wall of the case 10 and a friction member 42 engaged with the hub 31 extended from an inner lace of the second one way clutch OC2 and the peripheral wall of the case 10 by a spline, and the friction member 42 is arranged on an outer side in a diameter direction of the ring gear 26 of the planetary gear set 12. Further, the second one way clutch OC2 arranged in parallel therewith is arranged substantially at a center portion in an axial direction of an outer side in a diameter direction of the planetary gear set 12 by connecting the inner lace to the carrier Q of the planetary gear set 12 as described above and engaging the outer lace to the outer wall of the case 10 by a spline.

The brake 22 is arranged on an outer side of the rear wall of the case 10, and is constituted by a cover 10a covering a counter gear pair arranged there, a friction member 43 arranged on a rear side of the counter gear pair engaged with the hub 25 fixed to a rearmost portion of the sun gear 20 by a spline, and a hydraulic servo included in the rear wall of the case 10.

When a first speed (1st) is selected in the gear train, rotation from the input shaft 11 is inputted to the front sun gear 13 via the clutch 17, a reaction force is exerted to the carrier Q locked by engaging with the second one way clutch OC2, rotation at a reduced speed of a maximum reduction ratio outputted to a ring gear 26 is transmitted to a ring gear of a sub speed changing portion via the counter gear pair and is transmitted to a drive wheel of a vehicle from a differential apparatus, not illustrated.

Next, according to a second speed (2nd), rotation is inputted also from the input shaft 11 to the front sun gear 13 via the clutch 17, a reaction force is exerted to the rear sun gear 15 locked by engaging with the brake 22, and rotation at a reduced speed of the ring gear 26 is outputted. Rotation is inputted to the ring gear of the sub speed changing portion and is transmitted to the drive wheel of the vehicle from the differential apparatus, not illustrated.

Further, a third speed (3rd) is achieved by engaging a clutch on a side of a sub shaft portion by operating similar to the second speed with regard to the side of the main shaft portion. In this case, rotation from the third speed changing portion is transmitted to the drive wheel of the vehicle from the differential apparatus, not illustrated, via the planetary gear in a directly connected state by engaging the clutch.

Further, according to a fourth speed (4th), both of the planetary gear set 12 on the side of the main speed changing portion and the planetary gear on the side of the sub speed changing portion are brought into a directly connected state, and rotation inputted from the input shaft 11 is transmitted to the drive wheel of the vehicle from the differential apparatus, not illustrated, as it is by dispensing with speed reduction by the counter gear pair.

Figure 4:
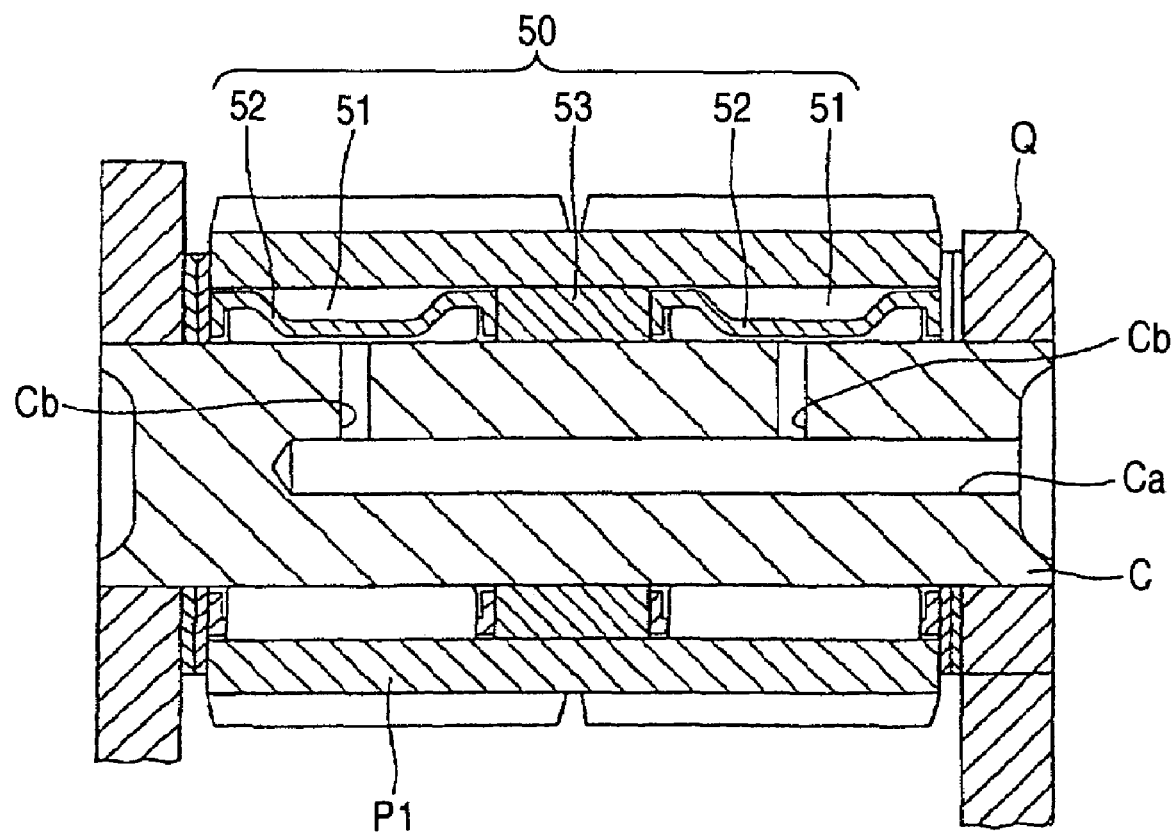
FIG. 4 is a sectional view showing a periphery of a pinion shaft of a planetary gear set according to the embodiment.

FIG. 4 is a sectional view showing a periphery of the pinion shaft of the planetary gear set according to the embodiment. As shown by FIG. 4, the needle-like roller bearing 50 includes the rollers 51, 51 arranged in double rows, the retainers 52, 52 for retaining the rollers 51, 51 of the respective rows, and the spacer 53 arranged between the retainers 52, 52, arranged at the surrounding of a pinion shaft C attached to the carrier Q and supports a long pinion P1 rotatably. Inside of the pinion shaft C is formed with a cap hole Ca extended from a right end face of FIG. 4 along an axial direction, and diameter holes Cb, Cb extended in a radius direction from middles of the cap hole Ca and opened to be opposed to insides of the retainers 52, 52 at a peripheral face of the pinion shaft C. The needle-like roller bearing 50 is lubricated by a lubricant supplied from outside of the pinion shaft C via the cap hole Ca and the diameter holes Cb, Cb. Further, it is preferable that a width of the spacer 53 is equal to or larger than a length of the rollers 51, 51 of two side rows interposing the spacer 53 and it is preferable that an outer diameter thereof is equal to that of the retainers 52, 52. Further, although there are predetermined clearances among the spacer 53 and the pinion shaft C and the pinion gear P1, the spacer 53 and the pinion shaft C are not slid relative to each other.

Figure 5:
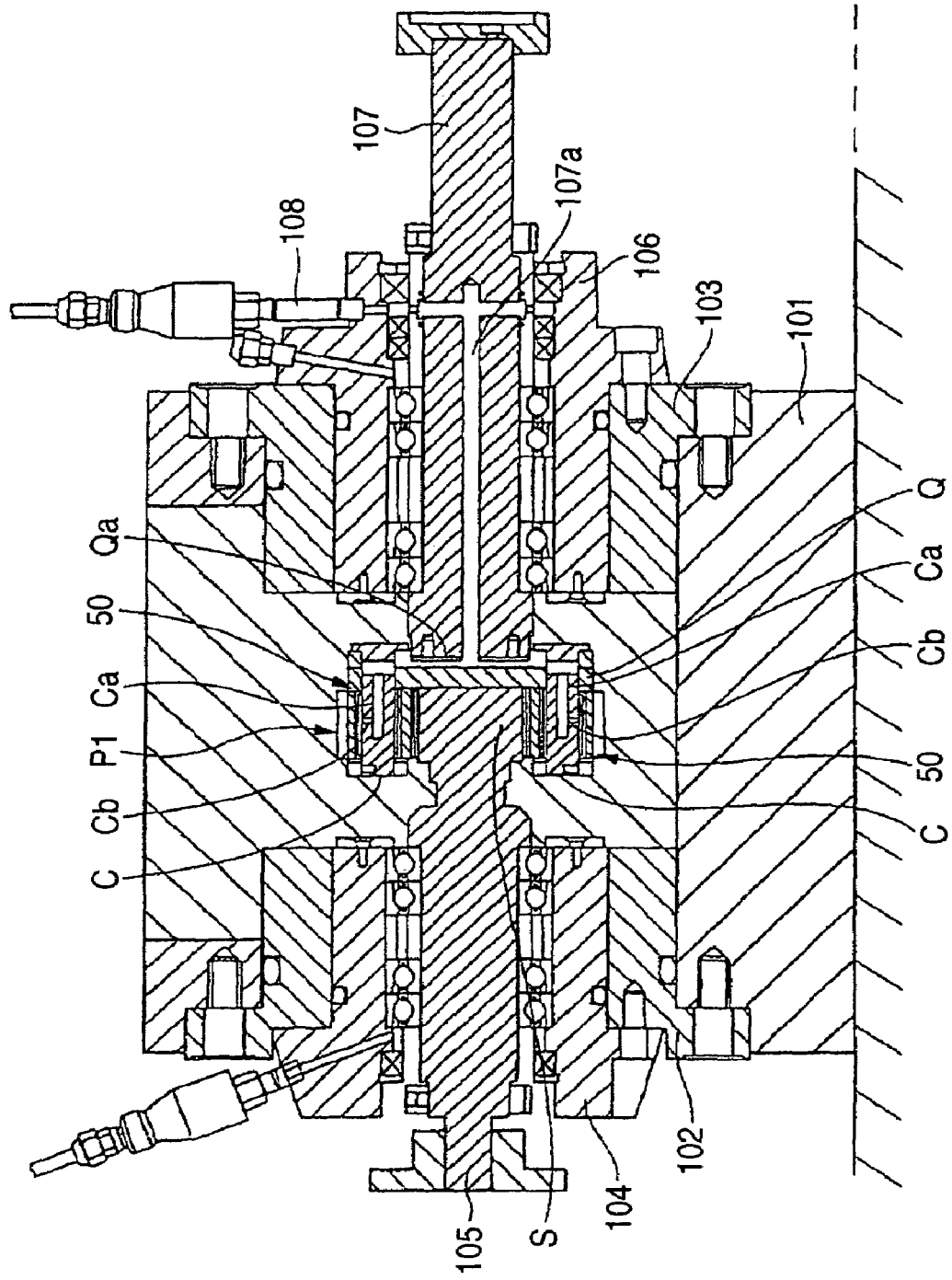
FIG. 5 is a sectional view of a test apparatus.

Next, an explanation will be given of a test which is carried out by the inventors. FIG. 5 is a sectional view of a test apparatus used in such a test. Supporting portions 102, 103 are attached to both ends of a base 101 above a level block. The supporting portion 102 on the left side is fitted with a holder 104 in a cylindrical shape and a sun gear rotating shaft 105 is rotatably supported by the holder 14 by a bearing. A sung gear S is formed at a right end of the sung gear rotating shaft 105.

The supporting portion 103 on the right side is fitted with a holder 106 in a cylindrical shape and a carrier rotating shaft 107 is rotatably supported by the holder 104 by a bearing. The carrier Q is attached to a right end of the carrier rotating shaft 107. The holder 106 is attached with a lubricant delivering apparatus 108 and a predetermined amount of a lubricant is supplied to the needle-like roller bearing 50 therefrom via a path 107a provided at an inner portion of the carrier rotating shaft 107, a path Qa formed at an inner portion of the carrier Q, the cap hole Ca and the diameter hole Cb of the pinion shaft C. The pinion shaft C rotatably supports the long pinion P1 via the needle-like roller bearing 50.

The test is carried out by setting comparative examples and examples to the test apparatus shown in FIG. 5. Test conditions are as follows.

(Test Condition)
pinion revolving speed: 8000 min$^{-1}$
pinion rotating speed: 10000 min$^{-1}$
pinion revolving radius: 45 mm
pinion weight: 274 g
test temperature: 120° C.
lubricant amount: 33 cc/min
pinion shaft diameter: φ14.00 mm
position of pinion shaft diameter hole (Cb): one piece at a center in an axial direction, 180° relative to a sun gear direction in a circumferential direction
heat treatment of pinion shaft: any of following heat treatments (1) through (8)

(1) high frequency quenching of JIS SUJ 2 steel (hardness: Hv 210) by effective hardness layer depth (depth of Hv 550 or more) of 1 mm (surface retained austenite amount: 10%, core portion retained austenite amount: 0%)

(2) completely quench JIS SUJ 2 steel to core portion (retained austenite amount: uniformly 10% as a whole)

(3) subject JIS SUJ 2 steel to nitriding treatment at 840° C., core portion hardness is adjusted to Hv 400 by tempering, thereafter, high frequency quenching (surface retained austenite amount: 15%, core portion retained austenite amount: 0%, surface nitrogen concentration: 0.1%, effective hardened layer depth: 1 mm)

(4) subject JIS SUJ 2 steel to nitriding treatment at 840° C., core portion hardness is adjusted to Hv 350 by tempering, thereafter, high frequency quenching (surface retained austenite amount: 15%, core portion retained austenite amount: 0%, surface nitrogen concentration: 0.1%, effective hardened layer depth: 1 mm)

(5) subject JIS SUJ 2 steel to nitriding treatment at 840° C., core portion hardness is adjusted to Hv 300 by tempering, thereafter, high frequency quenching (surface retained austenite amount: 15%, core portion retained austenite amount: 0%, surface nitrogen concentration: 0.1%, effective hardened layer depth: 1 mm)

(6) subject JIS SUJ 2 steel to nitriding treatment at 840° C., core portion hardness is adjusted to Hv 210 by tempering, thereafter, high frequency quenching (surface retained austenite amount: 15%, core portion retained austenite amount: 0%, surface nitrogen concentration: 0.1%, effective hardened layer depth: 1 mm)

(7) subject JIS SUJ 3 steel to nitriding treatment at 840° C., core portion hardness is adjusted to Hv 400 by tempering, thereafter, high frequency quenching (surface retained austenite amount: 15%, core portion retained austenite amount: 0%, surface nitrogen concentration: 0.1%, effective hardened layer depth: 1 mm)

(8) high frequency quenching of JIS SK 5 steel (hardness Hv 210) by effective hardened layer depth (depth of Hv 550 or more) of 1 mm (surface retained austenite amount: 10%, core portion retained austenite amount: 0%)

pinion inner diameter: φ19.03 mm
pinion width: 60.00 mm
needle-like roller diameter: φ2.5 mm Further, a roller length is determined pertinently in accordance with a number of rows. A test result is shown in Table 1. Further, Table 2 shows compositions of materials of the pinion shaft used.

TABLE 1

Bearings subjected to test and test result

| NO. | Example | row number & presence/ absence of retainer | inter row spec | retainer width | roller length | spacer width | shaft heat treatment | life order and cause of life expiration |
|---|---|---|---|---|---|---|---|---|
| 1 | pinion shaft heat treatment | double row cage & roller | spacer absent | 29.90 mm | 27.50 mm | — | ② | life order 13, flaking at center portion of shaft by bending shaft |

TABLE 1-continued

Bearings subjected to test and test result

| NO. | Example | row number & presence/ absence of retainer | inter row spec | retainer width | roller length | spacer width | shaft heat treatment | life order and cause of life expiration |
|---|---|---|---|---|---|---|---|---|
| 2 | comparative example | double row all roller | spacer present | — | 29.10 mm | 1.5 mm | (2) | life order 16 (shortest life), seizure between rollers |
| 3 | pinion shaft heat treatment | three row cage & roller | spacer absent | 19.90 mm | 17.60 mm | — | (2) | life order 12, flaking at center portion of shaft by bending shaft |
| 4 | pinion shaft heat treatment | three row all roller | spacer present | — | 18.90 mm | 1.5 mm, however, two pieces | (2) | life order 15, seizure between rollers |
| 5 | pinion shaft heat treatment | double row all roller | spacer present | — | 18.90 mm | 22.00 mm | (2) | life order 14, seizure between rollers |
| 6 | example | double row cage & roller | spacer present | 19.90 mm | 17.60 mm | 19.90 mm | (2) | life order 11, flaking at shaft edge by bending shaft |
| 7 | example | double row cage & roller | spacer present | 19.90 mm | 17.60 mm | 18.90 mm | (1) | life order 9, flaking at shaft edge by bending shaft |
| 8 | example | double row cage & roller | spacer present | 19.90 mm | 17.60 mm | 19.90 mm | (1), however, surface retained austenite amount of 3% at center portion 10 mm in axial direction | life order 8, flaking at shaft edge by bending shaft |
| 9 | example | double row cage & roller | spacer present | 19.90 mm | 17.60 mm | 19.90 mm | (1), however, surface retained austenite amount of 0% at center portion 10 mm in axial direction | life order 7, flaking at shaft edge by bending shaft |
| 10 | example | double row cage & roller | spacer present | 19.90 mm | 17.60 mm | 19.90 mm | (6), however, surface retained austenite amount of 0% at center portion 10 mm in axial direction | life order 6, flaking at shaft edge by bending shaft |
| 11 | example | double row cage & roller | spacer present | 19.90 mm | 17.60 mm | 19.90 mm | (5), however, surface retained austenite amount of 0% at center portion 10 mm in axial direction | life order 5, flaking at shaft edge by bending shaft |
| 12 | example | double row cage & roller | spacer present | 19.90 mm | 17.60 mm | 19.90 mm | (4), however, surface retained austenite amount of 0% at center portion in axial direction | life order 4, flaking at shaft edge by bending shaft |
| 13 | example | double row cage & roller | spacer present | 19.90 mm | 17.60 mm | 19.90 mm | (3), however, surface retained austenite amount of 0% at center portion 10 mm in axial direction | life order 3, flaking at shaft edge by bending shaft |
| 14 | example | double row cage & roller | spacer present | 19.90 mm | 17.60 mm | 19.90 mm | (7), however, surface retained austenite amount of 0% at center portion 10 mm in axial direction | life order 2, flaking at shaft edge by bending shaft |
| 15 | example | double row cage & roller | spacer present | 19.90 mm | 17.60 mm | 19.90 mm | (8) | life order 10, flaking at shaft edge by bending shaft |

TABLE 1-continued

Bearings subjected to test and test result

| NO. | Example | row number & presence/ absence of retainer | inter row spec | retainer width | roller length | spacer width | shaft heat treatment | life order and cause of life expiration |
|---|---|---|---|---|---|---|---|---|
| 16 | example | double row cage & roller | spacer present | 19.90 mm | 17.60 mm | 19.90 mm | ⑦, however, surface retained austenite amount of 0% at center portion 10 mm in axial direction, shaft oil hole is increased from 1 piece to 2 piece, oil hole position is set to center portion in axial direction of double side rows, and set to 0° to sun gear direction in circumferential direction | life order 1 (longest life), flaking at shaft edge portion by bending shaft |
| 17 | example | double row cage & roller | spacer present, however, spacer material is 46 nylon including 25% (weight %) of glass fiber different from steels of test No. 1 through 16 | 19.90 mm | 17.60 mm | 19.90 mm | ⑦, however, surface retained austenite amount of 0% at center portion 10 mm in axial direction, shaft oil hole is increased to 1 piece to 2 piece, oil hole position is set to center in axial direction of double side rows, and set to 0° to sun gear direction in circumferential direction | life is longer than test No. 16, flaking at shaft edge by bending shaft |
| 18 | example | double row cage & roller | spacer present, however, spacer material is 46 nylon including 25% of glass fiber different from steels of test No. 1 through 16 | 19.90 mm | 17.60 mm | 19.90 mm | ⑦, however, surface retained austenite amount of 0% at center portion 10 mm in axial direction, shaft oil hole is increased from 1 piece to 2 piece, oil hole position is set to center in axial direction of double side rows, and set to 0° to sun gear direction in circumferential direction, compressive residual stress at surface layer of track face is set to about 750 MPa. | life is longer than test No. 17, flaking at shaft edge by bending shaft |

Further, a compressive residual stress at a surface layer of a track face of a pinion shaft used in pinion shaft heat treatments and examples 6, 7, 8 is about 300 MPa and a compressive residual stress of a surface layer at a track face used in comparative example 2 is 0 MPa.

TABLE 2

Chemical compositions of steels used

| kind of steel | C % | Si % | Mn % | Cr % |
|---|---|---|---|---|
| SUJ2 | 0.98 | 0.24 | 0.40 | 1.40 |
| SUJ3 | 0.97 | 0.45 | 1.01 | 0.99 |
| SK5 | 0.81 | 0.22 | 0.35 | 0.09 |

Investigating on the test result, from test result of comparative examples 2, 4, 5, in all roller (without retainer) type, seizure is brought about at high speed rotation and it is found that the all roller type is not suitable for high speed rotation. On the other hand, from the test result of comparative examples 1, 3, it is found that there poses a problem that although by constituting a cage & roller (having retainer) type, although seizure can be prevented, flaking is brought about at a shaft center portion by reducing a radial clearance of the shaft center portion caused by bending the pinion shaft. In contrast thereto, from the test result of example 6, it is found that when the roller is restricted not to roll a surrounding of the shaft center portion, the roller becomes insensitive to bending of the shaft and the life is prolonged. Further, the position of flaking in this case is not at the shaft center portion but edge portions on sides of shaft ends of shaft rolling faces of the double side rows. The smaller the bending of the shaft, the smaller the contact face pressure of the edge portion.

Further, from the test result of example 15, it is found that when the pinion shaft made of high frequency quenched SK5 steel nullifying the retained austenite amount at the center portion in the diameter direction of the pinion shaft is used, the bending of the shaft is restrained and therefore, touch of the edge is alleviated and the life is further prolonged. In this way, it is effective to provide the spacer having a length equal to or longer than those of the rollers (rollers) at the double side rows and combined to use the shaft having the core portion retained austenite amount of 0%.

It is found that the life is prolonged owing to an effect of prolonging the life by chromium from the test result of example 7 using SUJ2 steel having a chromium concentration of 1.4%. Further, it is found that the test result of example 8 in which the surface retained austenite amount is reduced to 3% at 10 mm of the shaft center portion covered by the spacer, that the reduction in the retained austenite amount at a nonrolling face reduces an amount of bending the pinion shaft and does not deteriorate the fatigue strength of a rolling face and therefore, the life is further prolonged. Further, it is found from the test result of example 9 reducing the surface retained austenite amount to 0% at 10 mm of the shaft center portion covered by the spacer that the lift is further prolonged. In examples 10 through 13, the nitrogen concentration of the surface is increased to 0.1% in comparison with that of example 9 and it is found that the life is further prolonged thereby. The life differs among examples 10 through 13 because the lowest hardness of the pinion shaft differs, showing that it is preferable that the lowest hardness of the shaft is equal to or larger than Hv 300, preferably, equal to or larger than Hv 350, further preferably, equal to or larger than Hv 400. Although in examples 14, a material is changed from SUJ2 to SUJ3 in contrast to example 13, it is found from the test result that since the silicon concentration is increased, the stability of the retained austenite structure is increased, the shaft is made to be difficult to bend and therefore, there is achieved an effect of prolonging the life. In the example 16, in contrast to example 15, the position of the oil hole is changed from the position covered by the spacer to the position directed to the sun gear at the center of the double side rows and therefore, it is found from the test result that the lubricant is agitated in the bearing, much lubricant is supplied to the rolling face and therefore, there is achieved an effect of prolonging the life.

Further, in example 17, in contrast to example 16, the spacer material is changed from steel (STKM 17C hardened steel) to 46 nylon including 15% of glass fiber and therefore, sliding friction with the retainer is reduced and the life is prolonged. In example 18, in contrast to example 17, the compressive residual stress at the surface layer of the track face of the shaft is increased and therefore, the life is further prolonged.

Although an explanation is given of the invention in reference to the examples as described above, the invention is not to be interpreted to be limited to the above-described embodiment but can naturally be modified or improved pertinently. The invention is not limited to the Ravigneau type planetary gear mechanism but is applicable to a needle-like roller bearing and a pinion shaft used in a planetary gear mechanism of other type.

Figure 1A:
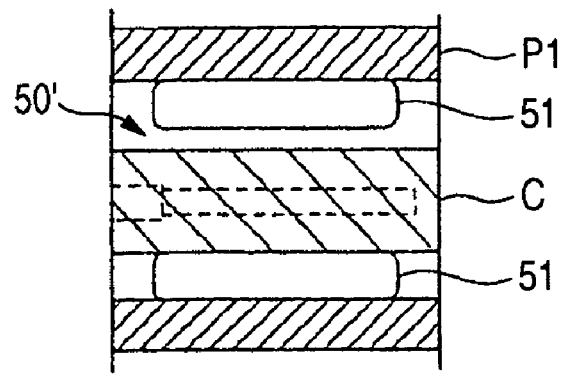
FIGS. 1A to 1C illustrate sectional views of a radial needle-like roller bearing 50 having a single row of rollers arranged between a pinion shaft C and a pinion gear P1.
Figure 1B:
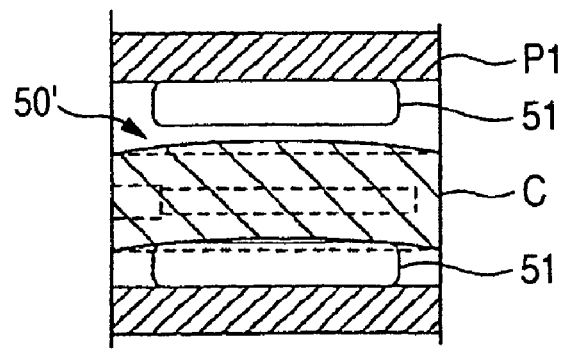
Figure 1C:
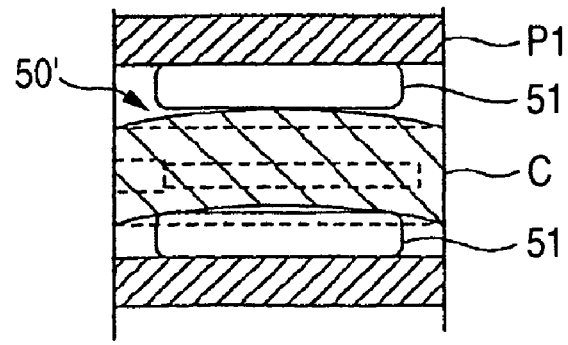
Figure 2A:
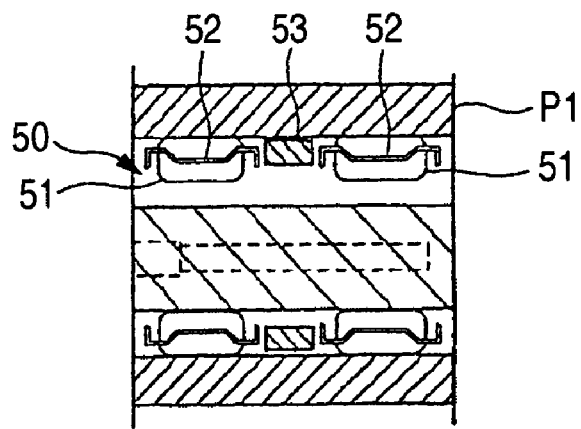
FIGS. 2A to 2C illustrate sectional views of the radial needle-like roller bearing 50 having double rows of rollers arranged between the pinion shaft C and the pinion gear P1.
Figure 2B:
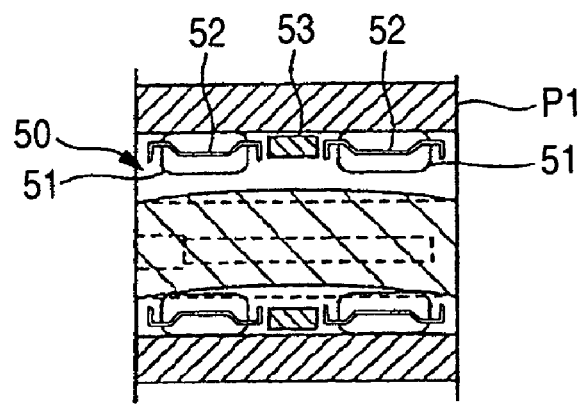
Figure 2C:
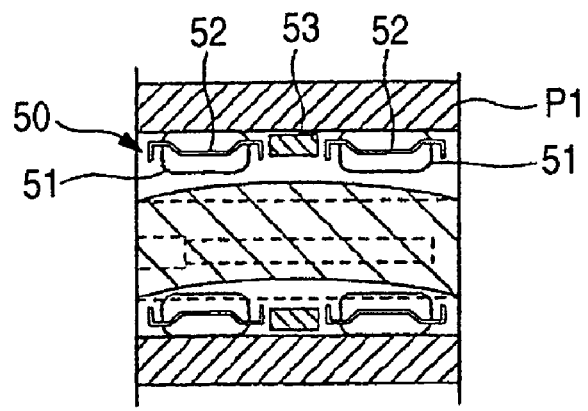

An explanation will be given of operation and effect of the invention in reference to the drawings. FIGS. 1A to 1C illustrate sectional views of a radial needle-like roller bearing 50' having a single row of rollers 51 arranged between a pinion shaft C and a pinion gear P1, FIG. 1A shows a no load state, FIG. 1B shows a state of elastically deforming the pinion shaft in accordance with a load, and FIG. 1C shows a state of plastically deforming the pinion shaft in addition to the elastic deformation in accordance with the load. FIGS. 2A to 2C illustrate sectional views of a radial needle-like roller bearing 50 having double rows of rollers 51, 51, retainers 52, 52 and a spacer 53 arranged between the pinion shaft C and the pinion gear P1, FIG. 2A shows a no load state, FIG. 2B shows a state of elastically deforming the pinion shaft in accordance with the load, and FIG. 2C shows a state of plastically deforming the pinion shaft in addition to the elastic deformation in accordance with a load.

As shown by FIG. 1C, when a sum of elastic bending and plastic bending of the pinion shaft (hereinafter, described as an amount of bending shaft) is increased and a distance between the pinion shaft and an inner diameter face of the pinion gear becomes smaller than a diameter of the roller, the roller (roller) cannot smoothly be rolled. In contrast thereto, the inventors have derived that the above-described problem can be resolved, (1) by preventing a roller (roller) from being rolled at a center portion in an axial direction of the shaft maximizing an amount of bending the shaft, or (2) by reducing the amount of bending the shaft.

Based on such a derivation, according to the invention, in order to achieve the object of (1), there is adopted a constitution of arranging the spacer 53 at a center portion of the shaft and arranging the retainers 52 and the rollers 51 (cage & roller) at the double sides thereof. Such a spacer 53 is not for guiding the roller (roller) 51 but functions not to move the rolling roller (roller) 51 to the center portion in the axial direction of the shaft maximizing to bend the shaft and it is preferable that a width in an axis line direction thereof is equal to or larger than a length of the rollers at the double side rows interposing the spacer 53. At the double side rows, bending of the shaft is not as large as that at the center portion and therefore, the roller (roller) is not hampered from being rolled smoothly.

Meanwhile, in order to achieve the object of (2), it is necessary that the retained austenite structure is not present at a center portion in a diameter direction over a total of the pinion shaft. It is important that further preferably, an amount of retained austenite at a surface of a center portion in an axial line direction of the pinion shaft at which the roller (roller) not rolled is smaller than those at the double side row portions at which the roller (roller) is rolled, most preferably, 0%. Further, in order to achieve (2), it is effective that the retained austenite structure is stabilized and a rate of disintegrating the retained austenite structure is retarded by that amount. For that purpose, it is preferable to set a nitrogen concentration of a surface of a hardened portion of a surface of the shaft to be equal to or larger than 0.05% or use a steel including silicon (Si) equal to or larger than 0.4% as the material.

Further, it is preferable that the nitrogen concentration and the silicon concentration are respectively equal to or smaller than 0.5% and equal to or smaller than 0.8% in order to prevent crack in high frequency quenching. Further, in order to restrain plastic bending of the pinion shaft, it is important that the lowest hardness of the pinion shaft (which is generally a hardness at a center portion in a diameter direction of the shaft) is equal to or larger than Hv 300, preferably, equal to or larger than Hv 350 and further preferably equal to or larger than Hv 400. Further, in order to prolong rolling fatigue life, it is preferable that a chromium concentration of the material (steel) is made to be equal to or larger than 0.9%. However, when the chromium concentration exceeds 1.8%, a rate of dissolving a carbide in high frequency quenching is frequently retarded, hardness becomes nonuniform and therefore, it is preferable to set the chromium concentration to be equal to or smaller than 1.8%. In any of the above-described cases, presence of the retained austenite structure is to be avoided at the center portion in the diameter direction of the shaft. A position of an oil outlet hole (hereinafter, written as oil hole) present in the surface of the shaft is important in view of supplying the lubricant to a total of the rolling face of the bearing. As described above, the pinion gear of the planetary gear mechanism is used in a field of a centrifugal force and therefore, the lubricant coming out from the oil hole is liable to flow in the direction of the centrifugal force and there is a concern of bringing about a state in which oil is not supplied to a portion of the rolling face. It is agitation of the lubricant by rotating the roller (roller) or the retainer to improve the situation, with regard to the position of the oil hole, it is most preferable that the lubricant coming out from the oil hole is disposed at a surface of the shaft at which the roller (roller) is rolled, and it is necessary that a portion thereof is included at least on the surface of the shaft covered by the retainer. Further, in the specification, "%" signifies "volume %" in the case of the retained austenite amount and signifies "weight %" in the case of a concentration of a chemical element.

Whereas the spacer is rotated at a rotational speed substantially the same as that of the pinion gear, retainers at the double side rows are rotated at a rotational speed slower than that of the pinion gear and therefore, a reduction in a sliding friction resistance between the spacer and the retainer amounts to a reduction in a temperature rise and therefore, the reduction is effective in restraining flaking or seizure. On the other hand, since the bearing used in the planetary gear mechanism is normally accompanied by revolving movement, the retainer is applied with a large repeated stress by colliding with the roller (roller) and therefore, it is preferable that the retainer is made of a steel having a strength. Hence, it is effective that the spacer is made of a resin, or when the spacer is made of a steel, a spacer coated with a phosphate coating is used to reduce a dynamic friction coefficient between the spacer and the retainer to reduce a temperature rise. Further, it is further preferable that the spacer is made of a resin from a view point of restraining the pinion shaft from being bent.

Since the bearing used in the planetary gear mechanism is the radial needle bearing for rotating the outer lace (pinion gear), the inner lace (shaft) becomes the weakest portion and therefore, strengthening of the pinion shaft is regarded to amount to prolong the life of the bearing. For example, it is effective for prolonging the life that the pinion shaft is subjected to shot peeing, the compressive residual stress of the surface layer portion becomes 500 through 1200 MPa, and the amount of retained austenite is set to 15 through 40%. The compressive residual stress and the amount of retained austenite of the surface layer portion of the pinion shaft are rectified by measured values at 50 μm below the surface. When the compressive residual stress is less than 500 MPa, the effect of prolonging the life is inconsiderable, when hard shot by which the compressive residual stress exceeds 1200 MPa is carried out, a crack is present in the surface layer portion, and the lift is shortened. Further, when the amount of retained austenite is less than 15%, the effect of prolonging the life is inconsiderable, and when the amount exceeds 40%, plastic bending of the pinion shaft is increased and therefore, the life is conversely shortened.

What is claimed is:

1. A radial needle-like roller bearing arranged between a pinion shaft and a pinion gear in a planetary gear mechanism of a vehicular automatic transmission, the radial needle-like roller bearing comprising:

rollers arranged in double rows, a plurality of retainers for retaining the rollers of the respective rows, and a spacer arranged between the retainers contiguous to each other, wherein the pinion shaft is made of a steel, and includes a surface hardened by quenching and a center portion which does not include a retained austenite structure, and the roller is rolled along a surface hardened by quenching.

2. A radial needle-like roller bearing arranged between a pinion shaft and a pinion gear in a planetary gear mechanism of a vehicular automatic transmission, the radial needle-like roller bearing comprising:

rollers arranged in double rows, a plurality of retainers for retaining the rollers of the respective rows, and a spacer arranged between the retainers contiguous to each other, wherein an amount of retained austenite at an outer surface of the pinion shaft covered by the spacer is lower than an amount of retained austenite at the surface of the pinion shaft at which the roller is rolled.

3. A radial needle-like roller bearing arranged between a pinion shaft and a pinion gear in a planetary gear mechanism of a vehicular automatic transmission, the radial needle-like roller bearing comprising:

rollers arranged in double rows, a plurality of retainers for retaining the rollers of the respective rows, and a spacer arranged between the retainers contiguous to each other, wherein the material of the pinion shaft includes chromium equal to or larger than 0.9% and equal to or smaller than 1.8%.

4. A radial needle-like roller bearing arranged between a pinion shaft and a pinion gear in a planetary gear mechanism of a vehicular automatic transmission, the radial needle-like roller bearing comprising:

rollers arranged in double rows, a plurality of retainers for retaining the rollers of the respective rows, and a spacer arranged between the retainers contiguous to each other, wherein the material of the pinion shaft includes silicon equal to or larger than 0.4% and equal to or smaller than 0.8%.

5. A radial needle-like roller bearing arranged between a pinion shaft and a pinion gear in a planetary gear mechanism of a vehicular automatic transmission, the radial needle-like roller bearing comprising:

rollers arranged in double rows, a plurality of retainers for retaining the rollers of the respective rows, and a spacer arranged between the retainers contiguous to each other, wherein the hardness of the pinion shaft is equal to or larger than Hv 300.

6. A radial needle-like roller bearing arranged between a pinion shaft and a pinion gear in a planetary gear mechanism of a vehicular automatic transmission, the radial needle-like roller bearing comprising:

rollers arranged in double rows, a plurality of retainers for retaining the rollers of the respective rows, and a spacer arranged between the retainers contiguous to each other, wherein the pinion shaft is provided with a hole for supplying a lubricant at the outer surface covered by the retainer.

7. A radial needle-like roller bearing arranged between a pinion shaft and a pinion gear in a planetary gear mechanism of a vehicular automatic transmission, the radial needle-like roller bearing comprising:

rollers arranged in double rows, a plurality of retainers for retaining the rollers of the respective rows, and a spacer arranged between the retainers contiguous to each other, wherein the spacer is made of a resin or made of a steel coated with a phosphate coating at a surface thereof.

8. A radial needle-like roller bearing arranged between a pinion shaft and a pinion gear in a planetary gear mechanism of a vehicular automatic transmission, the radial needle-like roller bearing comprising:

rollers arranged in double rows, a plurality of retainers for retaining the rollers of the respective rows, and a spacer arranged between the retainers contiguous to each other, wherein the pinion shaft is made of a steel, a compressive residual stress of a surface layer portion is set to 500 through 1200 MPa, and the amount of retained austenite is set to 15 through 40%.

9. A radial needle-like roller bearing arranged between a pinion shaft and a pinion gear in a planetary gear mechanism of a vehicular automatic transmission, the radial needle-like roller bearing comprising:

rollers arranged in double rows, a plurality of retainers for retaining the rollers of the respective rows, and a spacer arranged between the retainers contiguous to each other, wherein the pinion shaft is made of a steel, and includes a surface hardened by quenching and a center portion which does not include a retained austenite structure, the roller is rolled along a surface hardened by quenching, a nitrogen concentration of the surface of the pinion shaft is equal to or larger than 0.05% and equal to or smaller than 0.5%, the material of the pinion shaft includes chromium equal to or larger than 0.9% and equal to or smaller than 1.8%, the hardness of the pinion shaft is equal to or larger than Hv 300, the spacer is made of a resin or made of a steel coated with a phosphate coating at a surface thereof, and a compressive residual stress of a surface layer portion is set to 500 through 1200 MPa, and the amount of retained austenite is set to 15 through 40%.

10. A radial needle-like roller bearing arranged between a pinion shaft and a pinion gear in a planetary gear mechanism of a vehicular automatic transmission, the radial needle-like roller bearing comprising:

rollers arranged in double rows, a plurality of retainers for retaining the rollers of the respective rows, a spacer arranged between the retainers contiguous to each other, wherein the pinion shaft is made of a steel, and includes a surface hardened by quenching and a center portion which does not include a retained austenite structure, the roller is rolled along a surface hardened by quenching, a nitrogen concentration of the surface of the pinion shaft is equal to or larger than 0.05% and equal to or smaller than 0.5%, the material of the pinion shaft includes chromium equal to or larger than 0.9% and equal to or smaller than 1.8%, the material of the pinion shaft includes silicon equal to or larger than 0.4% and equal to or smaller than 0.8%, the hardness of the pinion shaft is equal to or larger than Hv 300, the spacer is made of a resin or made of a steel coated with a phosphate coating at a surface thereof, and a compressive residual stress of a surface layer portion is set to 500 through 1200 MPa, and the amount of retained austenite is set to 15 through 40%.

* * * * *